(12) United States Patent
Lv

(10) Patent No.: US 9,936,810 B2
(45) Date of Patent: Apr. 10, 2018

(54) ROCKING CHAIR

(71) Applicant: Feng Lv, Suzhou (CN)

(72) Inventor: Feng Lv, Suzhou (CN)

( * ) Notice: Subject to any disclaimer, the term of this patent is extended or adjusted under 35 U.S.C. 154(b) by 0 days.

(21) Appl. No.: 14/981,910

(22) Filed: Dec. 29, 2015

(65) Prior Publication Data
US 2017/0156500 A1   Jun. 8, 2017

(30) Foreign Application Priority Data

Dec. 3, 2015 (CN) .................... 2015 2 0987129 U

(51) Int. Cl.
A47C 1/14 (2006.01)
A47C 3/02 (2006.01)
(Continued)

(52) U.S. Cl.
CPC ............. *A47C 3/029* (2013.01); *A47C 1/14* (2013.01); *A47C 3/023* (2013.01); *A47C 3/03* (2013.01);
(Continued)

(58) Field of Classification Search
CPC ........... A47C 1/14; A47C 3/023; A47C 3/029; A47C 3/03; A47C 4/28; A47C 4/30;
(Continued)

(56) References Cited

U.S. PATENT DOCUMENTS

| 148,648 A | * | 3/1874 | Baer | ...................... A47C 3/029 |
| | | | | 297/32 |
| 3,114,572 A | * | 12/1963 | Hopkins | ................. A47C 3/029 |
| | | | | 297/133 |

(Continued)

FOREIGN PATENT DOCUMENTS

| FR | 2098651 A5 | * | 3/1972 | ............. A47C 3/029 |
| FR | 2098651 A5 | * | 3/1972 | ............. A47C 3/029 |

(Continued)

*Primary Examiner* — Ryan D Kwiecinski
(74) *Attorney, Agent, or Firm* — Wayne & Ken, LLC; Tony Hom

(57) ABSTRACT

The present invention relates to a rocking chair, which comprises a chair framework and a chair cover installed on the framework, wherein arc-shaped bottom pipes, a back pipe, a seat frame pipe, front foot pipes, rear foot pipes, armrest pipes, armrest supporting pipes and connecting pipes are arranged on the framework; the back ends of the armrest pipes are rotatably connected with the middle part of the back pipe; the front ends of the armrest pipes are rotatably connected with the armrest supporting pipes; seat frame connecting pieces are fixedly arranged on the lower end of the back pipe which is rotatably connected with the rear part of the seat frame pipe and rotatably connected with the upper parts of the rear foot pipes through the seat frame connecting pieces; the lower parts of the rear foot pipes are rotatably connected with the rear parts of the arc-shaped bottom pipes; one end of the connecting pipe is rotatably connected with the rear foot pipes; the other end is rotatably connected with armrest fixing pieces and the front end of the seat frame pipe; one end of the front foot pipes is rotatably connected with the front parts of the arc-shaped bottom pipes; the other end is rotatably connected with the seat frame pipe through the armrest fixing pieces; the upper ends of the armrest supporting pipes are rotatably connected with the armrest pipes; the other end is rotatably connected with the armrest fixing pieces; a safety lock is positioned at the armrest supporting pipes and the armrest fixing pieces for locking the rotating freedom between the armrest supporting pipes and the armrest fixing pieces; and the front foot pipes and the rear foot pipes are rotatably connected with the arc-shaped bottom pipes directly for determining the rigidity and the stability of a bracket.

5 Claims, 10 Drawing Sheets

(51) Int. Cl.
*A47C 3/03* (2006.01)
*A47C 4/30* (2006.01)
*A47C 5/10* (2006.01)
*F16B 12/40* (2006.01)
*A47C 3/029* (2006.01)
*A47C 3/023* (2006.01)
*A47C 4/28* (2006.01)

(52) U.S. Cl.
CPC .............. *A47C 4/28* (2013.01); *A47C 4/30* (2013.01); *A47C 5/10* (2013.01); *F16B 12/40* (2013.01)

(58) Field of Classification Search
CPC ......... A47C 5/10; F16B 12/40; A47D 13/102; A47D 13/105
See application file for complete search history.

(56) References Cited

U.S. PATENT DOCUMENTS

| | | | | |
|---|---|---|---|---|
| 4,285,543 A * | 8/1981 | Clark | ............... | A47C 3/029 297/133 |
| 4,772,067 A * | 9/1988 | Fowler | ............... | A47C 3/02 297/130 |
| 5,464,270 A * | 11/1995 | Chang | ............... | A47C 1/035 297/28 |
| 5,992,929 A * | 11/1999 | Liu | ............... | A47C 4/10 297/272.1 |
| 6,471,287 B1* | 10/2002 | Liu | ............... | A47C 3/029 297/32 |
| 7,156,456 B1* | 1/2007 | Chen | ............... | A47C 3/029 297/16.1 |
| 7,407,229 B1* | 8/2008 | Chen | ............... | A47C 1/034 297/259.2 |
| 2003/0025360 A1* | 2/2003 | Liu | ............... | A47C 4/28 297/16.2 |
| 2003/0214159 A1* | 11/2003 | Brandschain | ........ | A47C 3/029 297/32 |
| 2017/0086587 A1* | 3/2017 | Chen | ............... | A47C 3/029 |

FOREIGN PATENT DOCUMENTS

WO    WO 2015139252 A1 *  9/2015  ............. A47C 3/029
WO    WO-2015139252 A1 *  9/2015  ............. A47C 3/029

* cited by examiner

ROCKING CHAIR

CROSS-REFERENCE TO RELATED APPLICATIONS

The present application claims priority to, Chinese Patent Application No. 201520987129.6 with a filing date of Dec. 3, 2015. The content of the aforementioned application, including any intervening amendments thereto, is incorporated herein by reference.

TECHNICAL FIELD

The present invention relates to a rocking chair which, as an article for tourism and leisure, is suitable for the occasions of families, tourism, courtyards, open air, sandy beach, etc.

BACKGROUND

At present, there are two kinds of structures of chairs for tourism and leisure:

One structure is designed into a folding structure for the sake of convenience in carrying. The basic structure comprises front and rear foot pipes, front and rear crossed pipes, armrest pipes, a back pipe, etc. When being folded, the structure is folded from four sides into a fascicle-shaped structure. The structure has insufficient rigidity. The arc-shaped bottom pipes are not fixedly connected and are not synchronous, having poor linkage.

In the other structure, for the sake of comfort, the chair is designed into a rocking structure. The rocking chair uses arc-shaped bottom pipes, however, the front and the rear foot pipes are not rotatably connected with the bottom pipes directly, but in a sliding mode. The bracket has poor strength or is not convenient to fold.

SUMMARY

The present invention provides a rocking chair with respect to the above functional defect. A chair bracket thereof has stable structure, strong load-bearing capability, folding performance and rocking performance and integrates comfort and portability into a whole.

To achieve the above purpose, the present invention adopts the technical solution:

A rocking chair, characterized by comprising symmetrically installed arc-shaped bottom pipes, a seat frame pipe, a back pipe, front foot pipes, rear foot pipes, armrest pipes, armrest supporting pipes, connecting pipes and fabric.

The back ends of the armrest pipes are rotatably connected with the middle part of the back pipe; the front ends of the armrest pipes are rotatably connected with the armrest supporting pipes; seat frame connecting pieces are fixedly arranged on the lower end of the back pipe which is rotatably connected with the rear part of the seat frame pipe and the upper parts of the rear foot pipes downwards in sequence through the seat frame connecting pieces; the lower parts of the rear foot pipes are rotatably connected with the rear parts of the arc-shaped bottom pipes; one end of the connecting pipes is rotatably connected with the rear foot pipes, while the front parts of the arc-shaped bottom pipes are rotatably connected with the lower end of the front foot pipes.

The armrest fixing pieces are fixed on the upper parts of the front foot pipes, and the front foot pipes are respectively rotatably connected with the front ends of the connecting pipes, the front part of the seat frame pipe and the lower ends of the armrest supporting pipes through the armrest fixing pieces; the rear ends of the connecting pipes are rotatably connected with the rear foot pipes.

The fabric is sleeved on the back pipe and the seat frame pipe.

As a further improvement on the present invention: A safety lock used for locking the armrest supporting pipes not to rotate after the bracket is opened is arranged and installed on the armrest fixing pieces so as to further enhance the safety and the stability of the rocking chair.

As a preferred embodiment of the present invention: The safety lock comprises a positioning pin which is installed in an installing hole formed in the armrest fixing pieces; a lock hole is formed in the position corresponding to the installing hole in the armrest supporting pipe; and the positioning pin is locked into the lock hole during locking.

As a further improvement on the present invention: To increase the structural stability of the rocking chair, at least one fixed connecting pipe is arranged between the left and the right arc-shaped bottom pipes to probably form a "U"-shaped structure.

The present invention has novel and unique structural design, beautiful appearance, stable structure of chair bracket, strong load-bearing capability, long service life, folding performance and rocking performance and integrates comfort and portability into a whole.

DETAILED DESCRIPTION

To expand the understanding of the present invention, the embodiment will be further described below in combination with the drawings and the embodiment. The embodiment is only used for explaining the present invention, not limiting the protection scope of the present invention.

Figure 1:
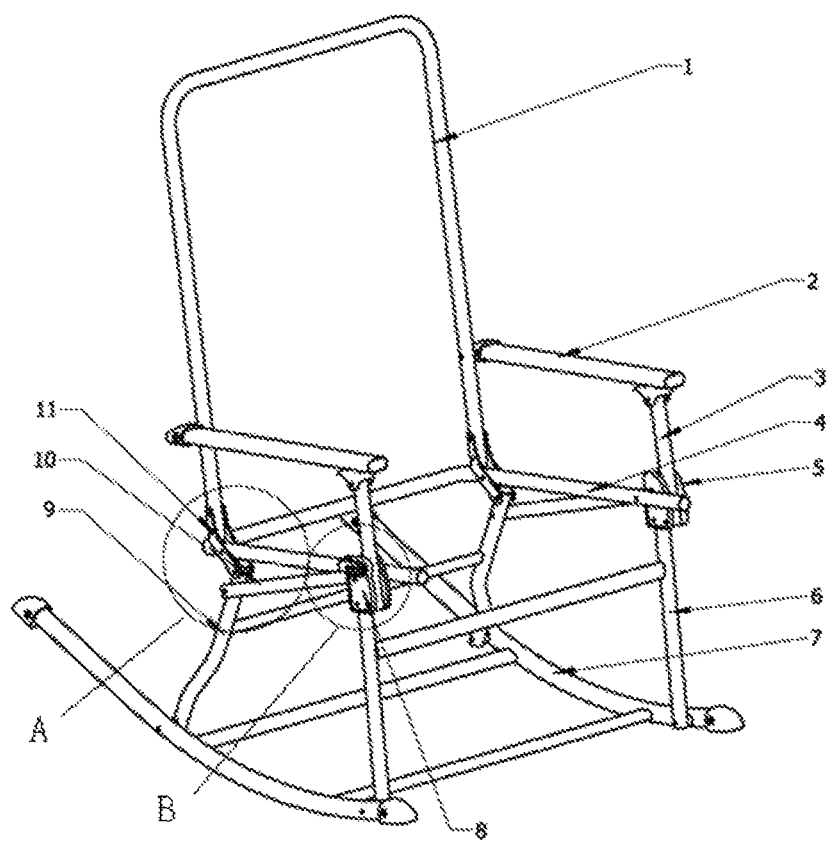
FIG. 1 is a structural diagram of assembly of a chair bracket of the present invention.

In embodiment 1, as shown in FIG. 1 and FIG. 6: The present invention relates to a rocking chair, which comprises fabric 12, arc-shaped bottom pipes 7, a seat frame pipe 4, front foot pipes 6, armrest pipes 2, a back pipe 1, rear foot pipes 9, connecting pipes 10, seat frame connecting pieces 11, armrest supporting pipes 3 and armrest fixing pieces 5 and 8.

Figure 6A:
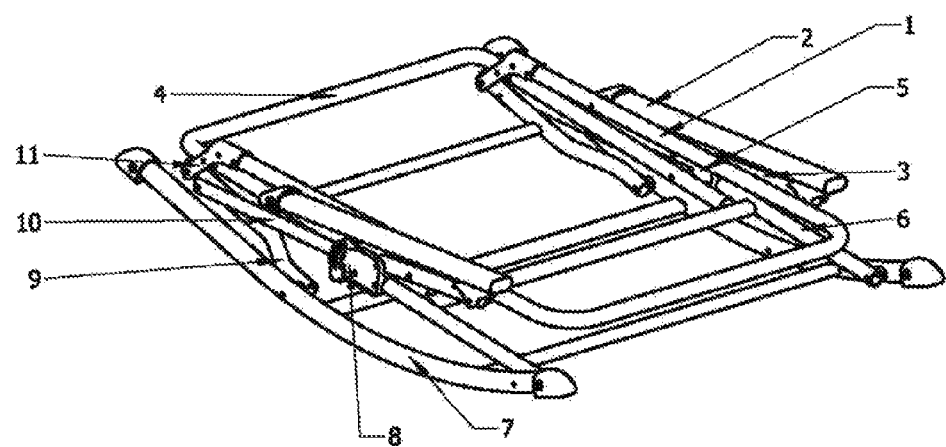
FIGS. 6*a* and 6*b* show structural diagrams after folding of a chair bracket of the present invention.
Figure 6B:
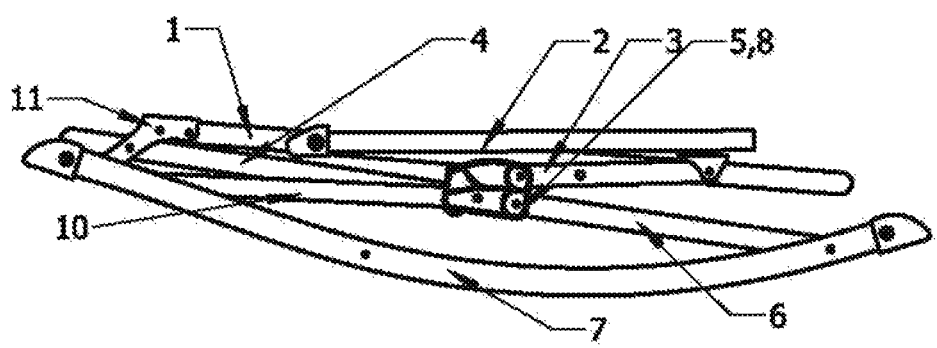

As shown in FIG. 1, FIGS. 6*a* and 6*b*: The back ends of the armrest pipes 2 are rotatably connected with the middle part of the back pipe 1; seat frame connecting pieces 11 are fixedly arranged on the lower end of the back pipe 1 which is rotatably connected with the seat frame pipe 4 and rotatably connected with the upper parts of the rear foot pipes 9 through the seat frame connecting pieces 11; the lower parts of the rear foot pipes 9 are rotatably connected with the rear parts of the arc-shaped bottom pipes 7; one end of the connecting pipes 10 is rotatably connected with the middle parts of the rear foot pipes 9; the other end of the connecting pipes 10 is rotatably connected with the upper parts of the front foot pipes 6; the connecting point is a common rotating point of the seat frame pipe and the front foot pipes; one end of the front foot pipes 6 is rotatably connected with the front parts of the arc-shaped bottom pipes 7; the armrest fixing pieces 5 and 8 are fixed to the upper ends of the front foot pipes 6 and are rotatably connected with the seat frame pipe 4 and the connecting pipes 10 through the connecting points arranged thereon; one end of the armrest pipes 2 is rotatably connected with the back pipe 1; the other end is rotatably connected with the armrest supporting pipes 3; the lower end of the armrest supporting pipe 3 on one side is rotatably connected with the armrest fixing piece 5; the lower end of the armrest supporting pipe 3 on the other side is rotatably connected with the armrest fixing piece 8; and the fabric 12 is sleeved on the back pipe 1 and the seat frame pipe 4.

Figure 2:
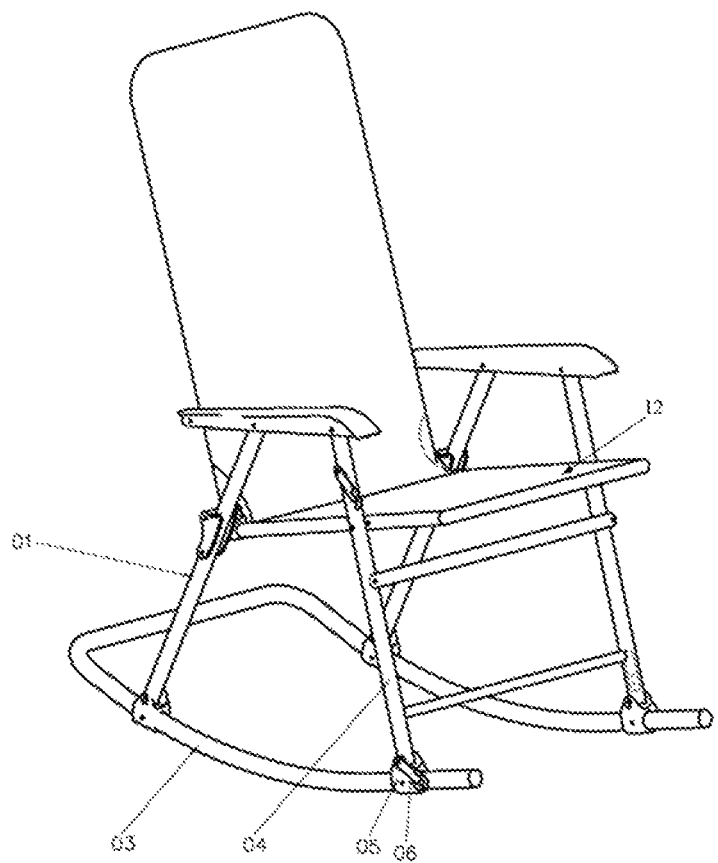
FIG. 2 is a structural comparison diagram of the present invention.

As shown in FIG. 2 which is a structural comparison diagram: The rear foot pipe 1 is rotatably connected with the arc-shaped bottom pipe 3 through the fixing piece 2; the front foot pipe 4 is connected with a sliding piece 5 sleeved on the arc-shaped bottom pipe 3; the sliding piece 5 slides back and forth on the arc-shaped bottom pipe 3 to drive the front foot pipe to move; to ensure the safety of the bracket, a safety lock 6 is also required to be added to the sliding piece 5; therefore, the whole bracket has poor safety due to insufficient sliding rigidity.

Figure 3:
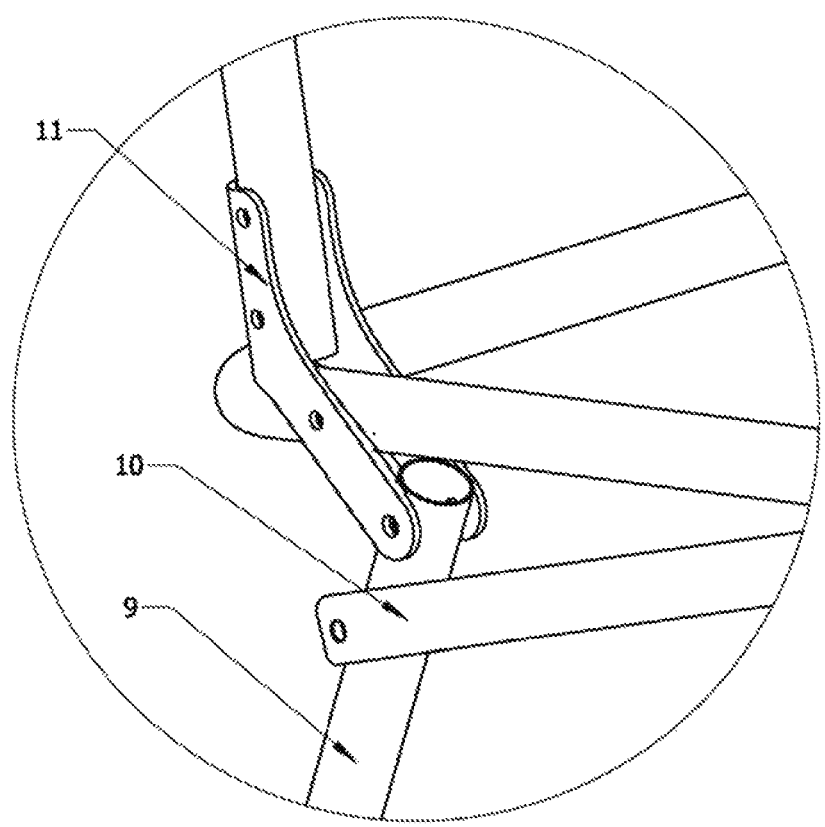
FIG. 3 is an enlarged view of A structure in FIG. 1.

As shown in FIG. 3: The seat frame connecting piece 11 is fixedly installed under the back pipe 1; hinging holes in the middle of the seat frame connecting piece 11 are rotatably connected with the seat frame pipe; a lower hole is rotatably connected with the rear foot pipe 9; and the middle part of the rear foot pipe 9 is rotatably connected with one end of the connecting pipe 10.

Figure 4:
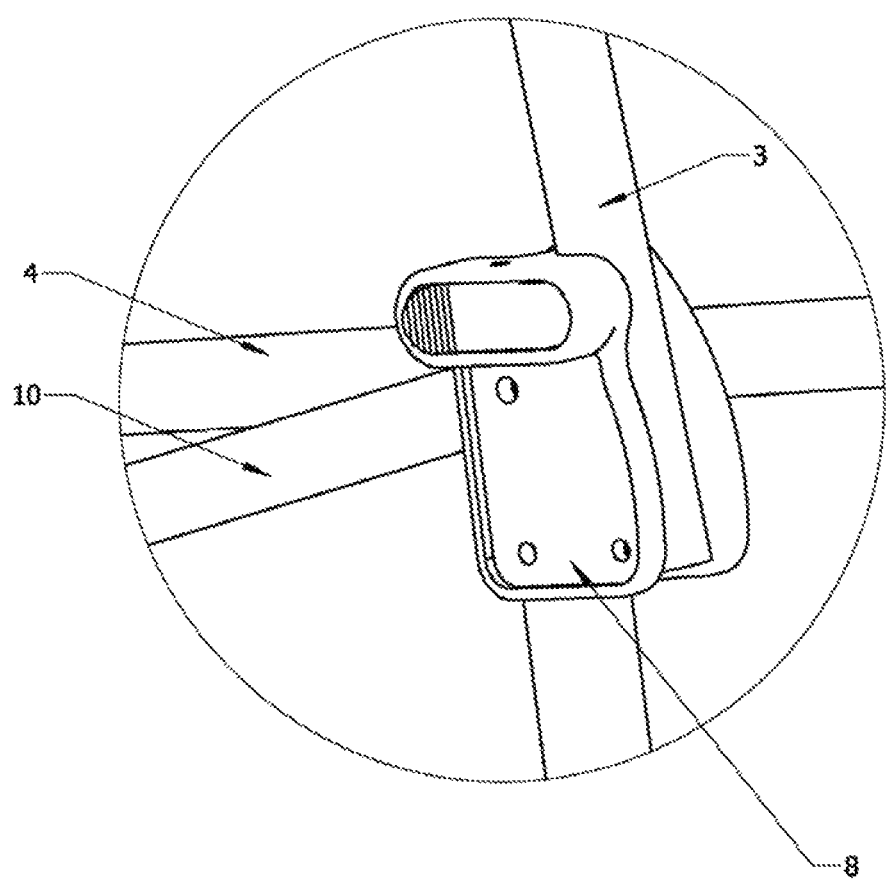
FIG. 4 shows enlarged views of B structure in FIG. 1.
Figure 7:
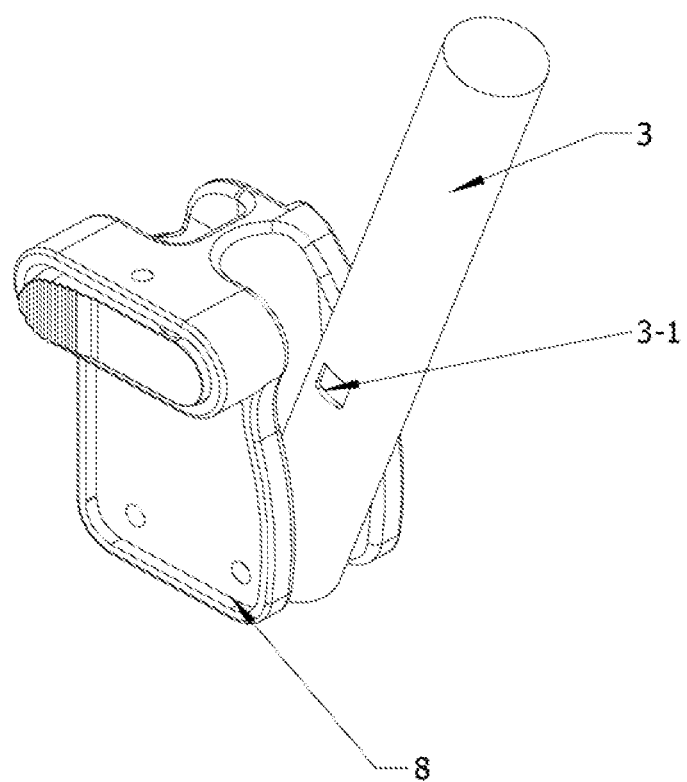
FIG. 7 is a locking structural diagram concerned in a chair of the present invention.
Figure 8:
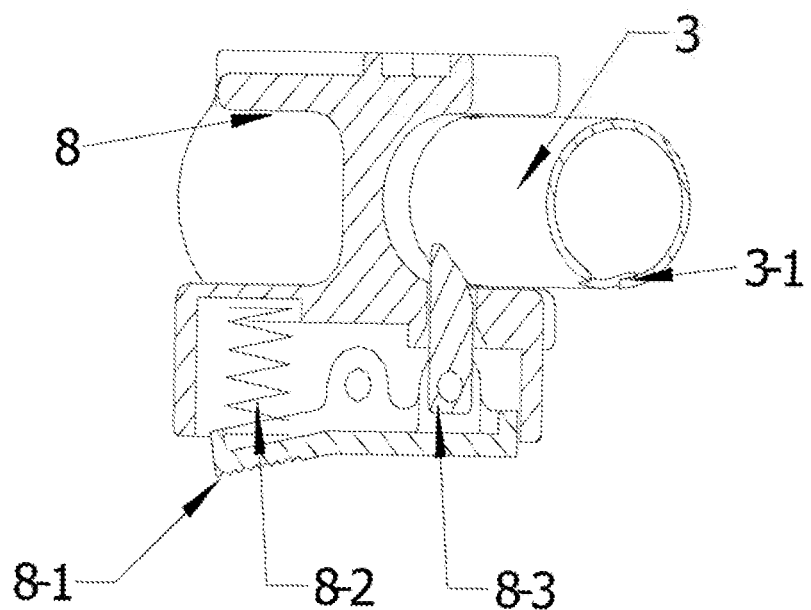
FIG. 8 shows locking sectional structural diagrams concerned in the present invention.

As shown in FIG. 4, FIG. 7 and FIG. 8 which is a bracket locking structure: A lock hole 3-1 is formed in the armrest supporting pipe 3; a lock is arranged on the armrest fixing piece 8; as shown in FIG. 7 and FIG. 8: the lock comprises a pressing piece 8-1, a spring 8-2 and a bolt 8-3; the spring 8-2 and the bolt 8-3 are installed on both ends of the pressing piece 8-1 to form a lever structure; under normal usage state, the spring 8-2 is stressed against the pressing piece 8-1 and a lever principle is applied to extend the head of the pin 8-3 into a clamping port of the armrest fixing piece 8; when the armrest supporting pipe 3 rotates to the pin 8-3, the pin 8-3 is ejected out by the surface and the spring 8-2 is extruded further; when the armrest supporting pipe 3 moves to the lock hole 3-1, the pin 8-3 is quickly inserted into the lock hole 3-1 under the action of spring force and the armrest supporting pipe 3 is locked; and the rotating freedom is constrained so the bracket is completely locked in the safety usage state.

Figure 5A:
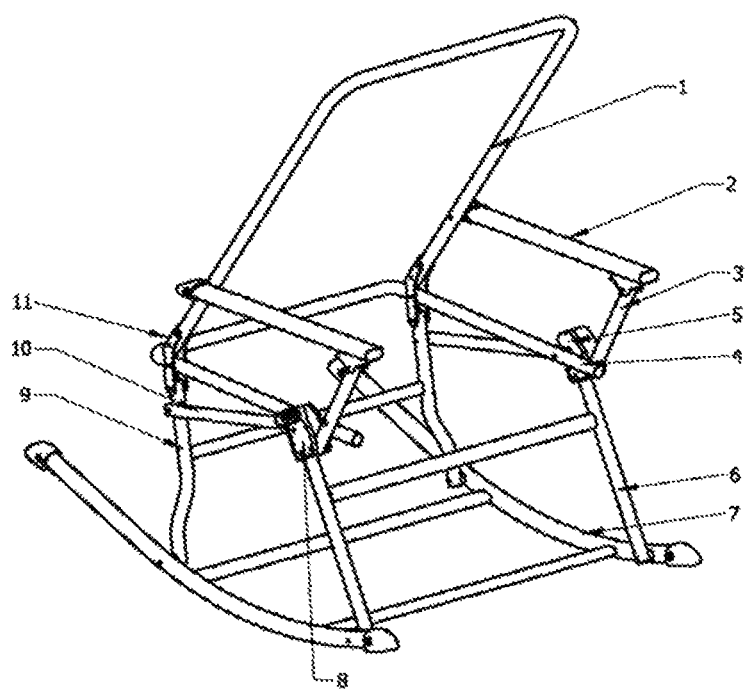
FIGS. 5*a* and 5*b* show structural diagrams during folding of a chair bracket of the present invention.
Figure 5B:
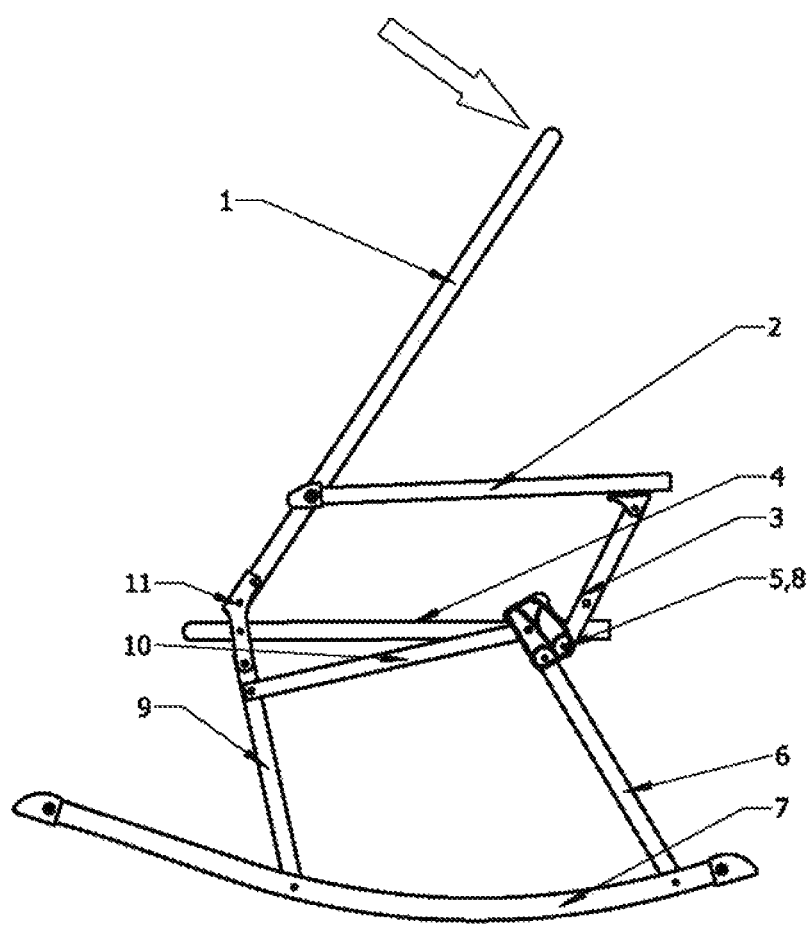

As shown in FIGS. 5a and 5b: After the bracket is unlocked by the safety lock, the rotating freedom between the armrest supporting pipe 3 and the armrest fixing piece 8 is released; the back pipe 1 is pulled forwards by hand; the back pipe 1 drives the rear foot pipe 9 through the seat frame connecting piece 11 fixed below to rotate in an opposite direction to the back pipe; the rear foot pipe 9, the front foot pipe 6, the connecting pipe 10 and the arc-shaped bottom pipe 7 are connected to form a quadrangle, but when the rear foot pipe 9 rotates backwards, the angle of the quadrangle is changed to drive the seat frame pipe 4 to rotate downwards and to drive the front foot pipe 6 to rotate backwards; the back pipe 1 rotates forwards; and the armrest supporting pipe 3 is driven through the armrest 2 to rotate forwards until the seat frame pipe 4 moves downwards to the arc-shaped bottom pipe 7.

I claim:

1. A rocking chair, characterized by comprising:
   symmetrically installed arc-shaped bottom pipes, a back pipe, a seat frame pipe, front foot pipes, rear foot pipes, armrest pipes, armrest supporting pipes, connecting pipes and fabric;
   back ends of the armrest pipes are rotatably connected with middle part of the back pipe; front ends of the armrest pipes are rotatably connected with the armrest supporting pipes; seat frame connecting pieces are fixedly arranged on a lower end of the back pipe which is rotatably connected with a rear part of the seat frame pipe and upper parts of the rear foot pipes downwards in sequence through the seat frame connecting pieces; lower parts of the rear foot pipes are rotatably connected with rear parts of the arc-shaped bottom pipes; one end of the connecting pipes is rotatably connected with the rear foot pipes, while front parts of the arc-shaped bottom pipes are rotatably connected with a lower end of the front foot pipes;
   armrest fixing pieces are fixed on upper parts of the front foot pipes, and the front foot pipes are respectively rotatably connected with front ends of the connecting pipes, a front part of the seat frame pipe and lower ends of the armrest supporting pipes through the armrest fixing pieces; rear ends of the connecting pipes are rotatably connected with the rear foot pipes; and
   the fabric is sleeved on the back pipe and the seat frame pipe.

2. The rocking chair according to claim 1, characterized in that: a safety lock used for locking the armrest supporting pipes not to rotate after the bracket is opened is arranged and installed on the armrest fixing pieces.

3. The rocking chair according to claim 2, characterized in that: the safety lock comprises a positioning pin which is installed in an installing hole formed in the armrest fixing pieces; a lock hole is formed in the position corresponding to the installing hole in the armrest supporting pipe; and the positioning pin is locked into the lock hole during locking.

4. The rocking chair according to claim 1, characterized in that: the arc-shaped bottom pipes comprise left and right arc-shaped bottom pipes; at least one fixed connecting pipe is arranged between the left and the right arc-shaped bottom pipes; and both ends of a positioning pipe are respectively fixedly connected with bottom contact arc-shaped pipes to form a U-shaped structure.

5. The rocking chair according to claim 1, characterized in that: the front foot pipes comprise left and right front foot pipes and the rear foot pipes comprise left and right rear foot pipes; at least one fixed connecting pipe is arranged between the left and the right front foot pipes; and at least one fixed connecting pipe is arranged between the left and the right rear foot pipes.

* * * * *